United States Patent [19]
Yamada et al.

[11] Patent Number: 5,148,306
[45] Date of Patent: Sep. 15, 1992

[54] ELECTROCHROMIC DEVICE WITH SPECIFIC RESISTANCES

[75] Inventors: Masayuki Yamada, Yokosuka; Yoshijiro Ushio, Tokyo, both of Japan

[73] Assignee: Nikon Corporation, Tokyo, Japan

[21] Appl. No.: 798,368

[22] Filed: Nov. 21, 1991

Related U.S. Application Data

[63] Continuation of Ser. No. 391,025, Aug. 9, 1989, abandoned.

[30] Foreign Application Priority Data

Aug. 17, 1988 [JP] Japan .................................. 63-203285
Feb. 8, 1989 [JP] Japan ...................................... 1-28970

[51] Int. Cl.$^5$ ................................................. G02L 1/01
[52] U.S. Cl. ............................................ 359/271; 359/269; 357/51
[58] Field of Search ................ 350/357, 353; 359/267, 359/269, 271, 275, 270; 357/51

[56] References Cited

U.S. PATENT DOCUMENTS 3,829,196  8/1974  Deb ................................... 350/160
4,844,591  7/1989  Arribart et al. ..................... 350/357

Primary Examiner—William Mintel
Assistant Examiner—Roy Potter
Attorney, Agent, or Firm—Shapiro and Shapiro

[57] ABSTRACT

An electrochromic device comprises a first electrode layer, an intermediate layer including an electrochromic layer, a second electrode layer, the first electrode layer, intermediate layer and second electrode layer being laminated in succession, and an electrode member connected to one of the first and second electrode layers and extending in a predetermined direction perpendicular to the direction of lamination of the first electrode layer, intermediate layer and second electrode layer. The resistances $R_1$, $R_2$ respectively of the first and second electrode layers and the internal resistance $R_3$ of the intermediate layer satisfy predetermined conditions to achieve uniform coloration.

12 Claims, 2 Drawing Sheets

ELECTROCHROMIC DEVICE WITH SPECIFIC RESISTANCES

This is a continuation of application Ser. No. 391,025 filed Aug. 9, 1989, now abandoned.

BACKGROUND OF THE INVENTION

1. Field of the Invention

The present invention relates to an electrochromic device capable of uniform coloring.

2. Related Background Art

A phenomenon of reversible coloration by reversible electrolytic oxidation or reduction under voltage application is called electrochromism.

Various attempts have been made, since more than 20 years ago, to prepare electrochromic devices (ECD) utilizing an electrochromic material showing such electrochromic phenomenon and capable of coloration and color erasure by voltage application, and to utilize such ECD for a light control device such as an anti-glare mirror, or a 7-segment numeric display unit.

For example, U.S. Pat. No. 3,829,196 discloses a totally solid-state ECD composed of a transparent electrode film (cathode), a tungsten trioxide film, an insulating film, for example of silicon dioxide, and an electrode film (anode) laminated in succession on a glass substrate.

The tungsten trioxide ($WO_3$) film is colored blue when a voltage is applied to said ECD, and returns to the colorless state when an inverse voltage is applied. The mechanism of the coloration and color erasure is not fully understood, but it is theorized that the coloration and color erasure of $WO_3$ is governed by a small amount of water present in the $WO_3$ film and the insulating film (ion conductive layer).

The reaction formulae are theorized as follows:

$$H_2O \rightarrow H^+ + OH^-$$

($WO_3$ film: cathode) $WO_3 + nH^+ + ne^- \rightarrow H_nWO_3$
colorless, transparent colored (insulating film: anode) $OH^- \rightarrow \frac{1}{2}H_2O + \frac{1}{4}O_2 \uparrow + \frac{1}{2}e^-$ Also, there is already known an ECD composed of an electrochromic layer capable of coloration by reduction (for example $WO_3$), an ion conductive layer, and a layer capable of reversible electrolytic oxidation (for example, iridium oxide or iridium hydroxide) laminated in succession between an upper electrode and a lower electrode for applying a predetermined voltage.

At least one of the electrode layers directly or indirectly sandwiching the electrochromic layer has to be transparent in order to show the coloration and color erasure to the exterior, and both electrode layers have to be transparent in case of a transmissive ECD.

It is already known that a transparent electrode can be prepared from $SnO_2$, $In_2O_3$, ITO ($SnO_2 - In_2O_3$ mixture) or ZnO, for example, but these materials are of relatively low transparency and have to be made thin. Because of this fact, and also because of other considerations, the ECD is usually formed on a substrate such as a glass plate or a plastic plate.

Also, for certain applications, a sealing substrate for protecting the device is positioned opposite to the substrate of the device, and the device is sealed with epoxy resin, for example.

The conventional ECD's have been subject to a significant drawback in that the coloration is very slow and is not uniform, and said uneven coloration is particularly pronounced in a large-sized ECD.

SUMMARY OF THE INVENTION

The object of the present invention is to provide an ECD capable of showing uniform coloration even in a large size.

The above-mentioned object can be attained, according to the present invention, by a certain relationship of the resistances of the intermediate layer including the electrochromic layer, and the upper and lower electrodes sandwiching said intermediate layer.

DESCRIPTION OF THE PREFERRED EMBODIMENTS

Figure 1:
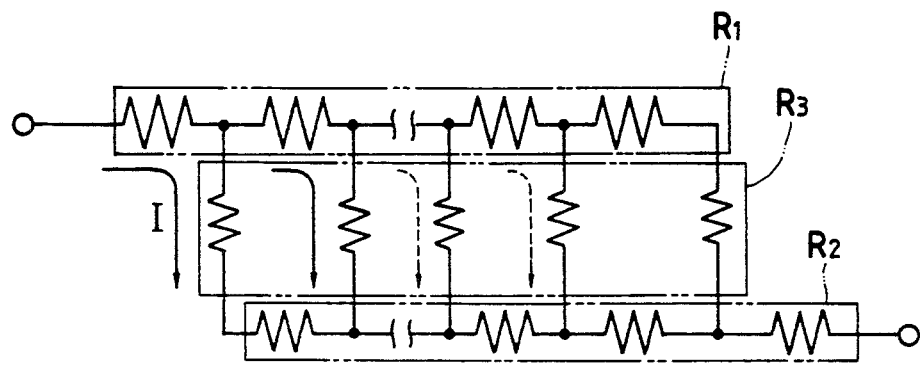
FIG. 1 is a schematic view showing the current flow in an ECD, for explaining the principle of the present invention.

In the following there will be explained the principle of the present invention.

At first explained is the relationship of the resistances of the intermediate layer, including the electrochromic layer, and the upper and lower electrodes sandwiching said intermediate layer, in a conventional ECD.

In the conventional ECD, the resistance $R_1$ of the upper electrode layer, the resistance $R_2$ of the lower electrode layer and the internal resistance $R_3$ of the intermediate layer sandwiched between said electrode layers satisfy following relation (1):

$$\frac{R_1 + R_2}{100} > R_3 \quad (1)$$

The resistance $R_1$ or $R_2$ of the upper or lower electrode is measured in a direction substantially perpendicular to the extending direction of a connection electrode provided for at least one of said upper and lower electrodes, and the resistance $R_3$ of the intermediate layer is measured in the direction of thickness thereof.

The resistances $R_1$, $R_2$ and $R_3$ are defined as follows:

$$R_1 = \frac{\rho_1 \cdot S}{d_1 \cdot l^2} \quad (2)$$

$$R_2 = \frac{\rho_2 \cdot S}{d_2 \cdot l^2} \quad (3)$$

$$R_3 = \frac{\rho_3 \cdot d_3}{S} \quad (4)$$

wherein:
$\rho_1$: resistivity of upper electrode layer;
$\rho_2$: resistivity of lower electrode layer;
$\rho_3$: ion resistivity of intermediate layer;
$d_1$: thickness of upper electrode layer;
$d_2$: thickness of lower electrode layer;
$d_3$: thickness of intermediate layer;

l: shortest of the lengths, in the extending direction of connection electrode, of the upper or lower electrode layer not connected to said connection electrode, the connection electrode and the intermediate layer; and S: superposed area of the upper electrode layer, the intermediate layer and the lower electrode layer, when seen from the direction of lamination thereof.

It is also assumed that the resistance of the connection electrode is approximately zero, which means following conditions apply:

$$\frac{\rho_4}{d_4} < \frac{\rho_1}{d_1}, \frac{\rho_4}{d_4} < \frac{\rho_2}{d_2}$$

wherein $\rho_4$: resistivity of connection electrode: and $d_4$: thickness of connection electrode.

FIG. 1 schematically shows the state of flow of current I when a voltage is applied to an ECD of the above-explained resistance relationship. Since the vertical resistance of the intermediate layer is smaller than the horizontal resistance of the upper electrode layer, most of the current I flows into the intermediate layer from an end of the upper electrode layer close to the connection electrode. Consequently, in a portion of the ECD close to the connection electrode, the aforementioned reaction proceeds to show faster and denser coloration, whereas in the central portion and in a portion opposite to said connection electrode, the coloration is much slower and paler due to much lower current density.

This phenomenon results in uneven coloration, which is more pronounced in a large-sized ECD.

Also, the erasure of coloration proceeds unevenly for the same reason, though the extent of unevenness is less pronounced than in the coloration phase.

According to one preferred mode of the present invention, in an electrochromic device composed of a laminate structure at least of an upper electrode, an electrochromic layer, and a lower electrode, uniform coloration is achieved (even in a large-size device) by selecting the resistances $R_1$, $R_2$ of the upper and lower electrodes and the internal resistance $R_3$ of the electrochromic device so as to satisfy relations:

$$R_1 < R_3 \tag{5}$$

and $$R_2 < R_3 \tag{6}.$$

Figure 2:
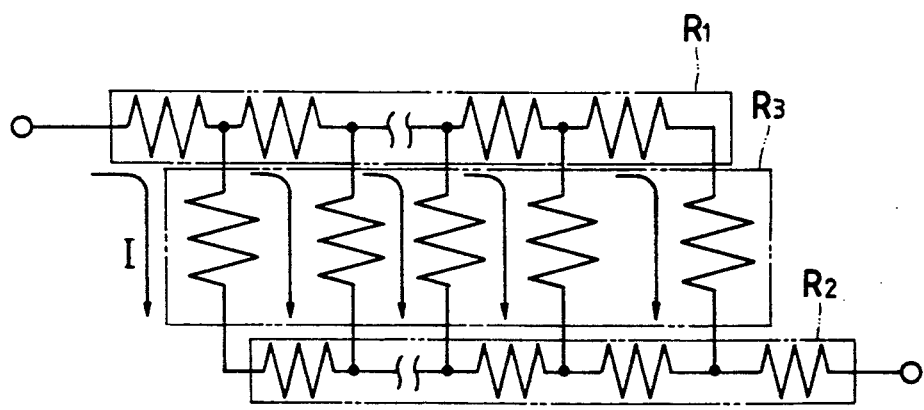
FIG. 2 is a schematic view showing the current flow in an ECD embodying the present invention.

FIG. 2 shows the state of flow of the current I in the ECD of the present invention, when a voltage is applied across the upper electrode layer (positive side) and the lower electrode layer (negative side).

Since the resistances of two electrode layers and the internal resistance of the intermediate layer are so selected as to satisfy the above-mentioned relations:

$$R_1 < R_3 \tag{5}$$

and $$R_2 < R_3 \tag{6},$$

the current supplied from the connection electrode of the upper electrode layer (in the structure shown in FIG. 2), at first flows in the upper electrode layer without a substantial voltage slope therein, and uniformly flows into the intermediate layer toward the lower electrode layer. Consequently, the voltage across the upper and lower electrode layers is substantially constant in any part of the electrode layers in the horizontal direction.

According to another preferred mode of the invention, $R_1$, $R_2$, and $R_3$ may satisfy the following condition:

$$\frac{R_1 + R_2}{10} < R_3$$

which has been experimentally found to promote coloration and erasure of coloration.

For achieving more uniform coloration, $R_3$ should be made as large as possible in comparison with $R_1$ and $R_2$, and experimentally preferred is a condition:

$$(R_1 + R_2) < R_3 \tag{8},$$

or more particularly:

$$4(R_1 + R_2) < R_3 \tag{9}.$$

In the present invention, the relationship of the resistances $R_1$, $R_2$ of the electrode layers is not important. If both layers are transparent electrodes, the resistance of the uppermost electrode layer tends to become larger, in practical film formation, than that of the electrode layer formed directly on the substrate.

The laminate structure of the ECD of the present invention is only required to have an upper electrode layer, an electrochromic layer and a lower electrode layer. There may be employed, for example, a structure including a liquid electrochromic layer, an intermediate layer containing liquid electrolyte, a structure employing an organic electrochromic material or a structure utilizing metal ions such as lithium ions instead protons. However, there is preferred a totally solid thin film structure composed of four layers such as electrode layer/electrochromic layer/ion conductive layer/electrode layer or five layers such as electrode layer/reduction coloring electrochromic layer/ion conductive layer/reversible electrolytic oxidation layer/electrode layer.

The transparent electrode can be formed, for example, of $SnO_2$, $In_2O_3$, or ITO. Such electrode layer can be generally formed by a vacuum thin film deposition technique such as vacuum evaporation, ion plating or sputtering.

The reduction coloring electrochromic layer can be generally composed of $WO_3$ or $MoO_3$.

The ion conductive layer can be composed, for example, of silicon oxide, tantalum oxide, titanium oxide, aluminum oxide, niobium oxide, zirconium oxide, hafnium oxide, lanthanum oxide or magnesium fluoride. The thin film of such materials is insulating to electrons depending on the method of film preparation, but is conductive to protons ($H^+$) and hydroxyl ions ($OH^-$).

The coloring and color erasing reactions of the electrochromic layer require cations, so that $H^+$ ions or $Li^+$ ions have to be incorporated in the electrochromic or other layer. The $H^+$ ions need not necessarily be present from the beginning but can be generated under the voltage application, and water may be added instead of $H^+$ ions. The amount of water can be very small, and the coloring and color erasing reactions may take place even by moisture spontaneously entering from the air.

It is possible to place either of the electrochromic layer and the ion conductive layer above the other. Furthermore, there may be provided a reversible electrolytic oxidation layer (constituting an oxidation coloring electrochromic layer) or a catalytic layer in opposed relation to the electrochromic layer across the ion conductive layer Such layer may be composed, for example, of oxide or hydroxide of iridium, nickel, chromium, vanadium, rutenium or rhodium. Such materials may be dispersed in the ion conductive layer or in the transparent electrode, or may be used for dispersing the material of said layers therein. The opaque electrode layer may also serve as a reflective layer, and can be composed of a metal such as gold, silver, aluminum, chromium, tin, zinc, nickel, rutenium, rhodium or stainless steel.

The upper and lower electrode layers have to be connected to external wirings for charge (current) supply. In the use of a transparent electrode which is higher in resistance than the external wirings, a connection electrode of low resistance is superposed, in an area as large as possible, with (in contact with) the transparent electrode. Normally, the connection electrode of low resistance is formed as a belt in the peripheral area of the transparent electrode layer. Said electrode of low resistance can be composed of the materials for the above-mentioned opaque electrode layer, for example aluminum.

In the use of an opaque electrode which is of low resistance, a part of said electrode can be used as the connection electrode.

Figure 3:
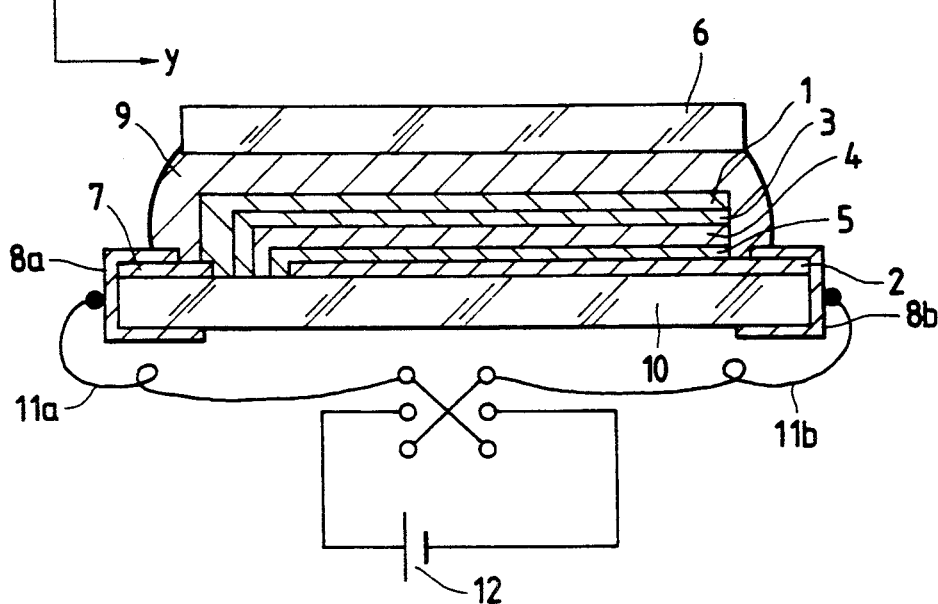
FIG. 3 is a schematic cross-sectional view of an ECD embodying the present invention.

FIG. 3 is a schematic cross-sectional view of an embodiment of the ECD of the present invention, wherein the z-direction corresponds to the direction of thickness of the ECD.

At first on the entire surface of a rectangular or parallelogram glass substrate 10 ($25 \times 15$ cm; area $S = 375$ cm$^2$; length l of connection electrodes for the upper and lower electrode layers=25 cm) there was formed an ITO electrode layer of a thickness $d_2 = 2 \times 10^{-5}$ cm (resistivity $\rho_2 = 2 \times 10^{-4}$ $\Omega$cm).

Then said ITO electrode layer was split into two portions at an end part thereof by forming a narrow groove, thereby forming a connection part 7 for the upper electrode, and a lower electrode layer 2. The groove may be formed by etching or laser beam cutting, for example.

Said connection part 7 and lower electrode layer 2 may be formed directly by masked evaporation of ITO.

On said lower electrode layer 2, there were formed, in succession, a reversible electrolytic oxidation layer 5 consisting of a mixture of iridium oxide and tin oxide, an ion conductive layer 4 consisting of tantalum oxide, and a reduction coloring electrochromic layer 3 consisting of tungsten oxide.

The intermediate layer, consisting of the above-mentioned three layers 3, 4 and 5, has a thickness $d_3 = 1.5 \times 10^{-4}$ cm, and an ion resistivity $\rho_3 = 2 \times 10^8$ $\Omega$cm.

On the electrochromic layer 3, there was formed, by evaporation, an ITO electrode layer of a thickness $d_1 = 2 \times 10^{-5}$ cm (resistivity $\rho_1 = 4 \times 10^{-4}$ $\Omega$cm) as an upper electrode layer 1. Said ITO layer was formed so as to contact, at an end thereof, with the connection part 7 formed on the substrate 10.

The resistivity and ion resistivity of the layers can be varied by suitably selecting the conditions of film formation, such as Ar/O$_2$ ratio, degree of vacuum, film forming rate, substrate temperature, high-frequency power applied, etc.

The resistances $R_1$, $R_2$ and $R_3$ of the layers are calculated as follows:

$$\rho_1/d_1 = 20 \ \Omega$$
$$\rho_2/d_2 = 10 \ \Omega$$
$$\rho_3 \cdot d_3 = 3 \times 10^4 \ \Omega\text{cm}^2$$
$$l = 25 \text{ cm}, \ S = 375 \text{ cm}^2$$

Consequently:

$$R_1 = \rho_1 \cdot S/d_1 l^2 = 12 \ \Omega$$
$$R_2 = \rho_2 \cdot S/d_2 l^2 = 6 \ \Omega$$
$$R_3 = \rho_3 \cdot d_3/S = 80 \ \Omega$$

Thus the condition 4 $(R_1+R_2)<R_3<5(R_1+R_2)$ is satisfied.

Then external wirings 11a, 11b were connected, to two phosphor bronze clips of square-C section of a length of 25 cm (connection electrodes) 8a, 8b, which were then mounted on end portions of the substrate 10 in such a manner that the clip 8a is in contact with the connection part 7 for the upper electrode while the clip 8b is in contact with a part of the lower electrode layer 2. In this case, the clips 8a, 8b constituting the input and output electrodes are regarded as substantially zero resistance (constant potential in any part). The wiring connections to the clips may be by soldering or conductive adhesive, for example.

The shape and dimension of the clips 8a, 8b are so selected as to be capable of defining the position of a sealing substrate 6 for masking the non-display portion in the peripheral part of the ECD.

Finally, the sealing glass substrate 6, coated with epoxy sealing resin 9, was superposed on an area between the clips 8a, 8b and the sealing resin was hardened to complete the ECD of the present embodiment. A coloring voltage (+3 V) was applied, by a power source 12, across the upper and lower electrode layers 1, 2 of thus prepared ECD, whereby the ECD showed rapid and uniform coloration over the entire surface, reducing the transmittance of the light of 633 nm to 10% after 20 seconds.

The transmittance remained in this state for some time even after the termination of voltage application, and was elevated to 70 % after application of an erasing voltage ($-3$ V) for 20 seconds.

For purpose of comparison, another ECD of same dimensions and thicknesses was prepared with modified resistivity $\rho_1$, $\rho_2$ and ion resistivity $\rho_3$ of the layers. Resistances were $R_1 = 12 \ \Omega$, $R_2 = 6 \ \Omega$, and $R_3 = 0.15 \ \Omega$, so that:

$$\frac{R_1 + R_2}{100} > R_3.$$

In the same test as conducted with the foregoing embodiment, this ECD showed uneven coloration and color erasure.

Figure 4:
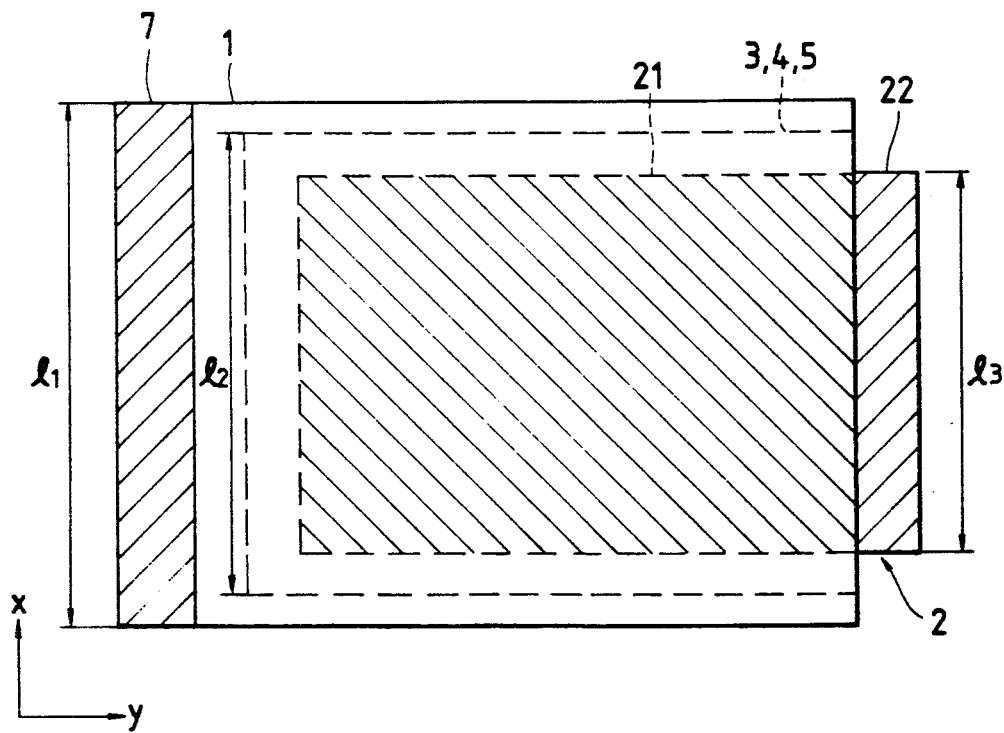
FIG. 4 is a plan view of an ECD for explaining the definition of conditions of the present invention.

Now reference is made to FIG. 4 for explaining the definition of S and l.

FIG. 4 is a plan view of a part of the ECD shown in FIG. 3, seen along the Z-axis from above the upper electrode layer 1. For explaining the definition of S and l, the structure shown in FIG. 4 is partly different from what is shown in FIG. 3.

S corresponds to the superposed area, when seen along z-axis, of the upper electrode 1, the intermediate layers 3, 4, 5 and the lower electrode 2. In the structure shown in FIG. 4, the area 21 of the lower electrode 2 is smallest among these. Consequently, the area S corresponds to the area 21 of the lower electrode 2. If the area of the intermediate layers 3, 4, 5 were smallest among the upper electrode 1, the intermediate layers 3, 4, 5 and the lower electrode 2, the area S would correspond to the area of said intermediate layers. In FIG. 4, an area 22 indicates the remaining part of the lower electrode 2, excluding the area 21.

l corresponds to the shortest of the length $l_1$ of the connection electrode 7 in the x-direction in, the length $l_3$ of the lower electrode 2 in the x-direction, and the length $l_2$ of the intermediate layers 3, 4, 5, in the X-direction.

What is claimed is:

1. An electrochromic device comprising:
    a first electrode layer;
    an intermediate layer including an electrochromic layer;
    a second electrode layer, said first electrode layer, said intermediate layer and said second electrode layer being laminated in succession; and
    an electrode member connected to one of said first and second electrode layers and extending in a predetermined direction transverse to the direction of lamination of said first electrode layer, said intermediate layer and said second electrode layer;
    wherein the resistance $R_1$, $R_2$ respectively of said first and second electrode layers and the internal resistance $R_3$ of said intermediate layer satisfy the following condition:

$$\frac{R_1 + R_2}{10} < R_3$$

and resistances $R_1$, $R_2$ and $R_3$ being defined as follows:

$$R_1 = \frac{\rho_1 \cdot S}{d_1 \cdot l^2}$$

$$R_2 = \frac{\rho_2 \cdot S}{d_2 \cdot l^2}$$

$$R_3 = \frac{\rho_3 \cdot d_3}{S}$$

wherein
$\rho_1$: resistivity of said first electrode layer;
$\rho_2$: resistivity of said second electrode layer;
$\rho_3$: ion resistivity of said intermediate layer;
$d_1$: thickness of said first electrode layer;
$d_2$: thickness of said second electrode layer;
$d_3$: thickness of said intermediate layer;
l: shortest of respective lengths, in said predetermined direction, of the electrode layer other than said one electrode layer, said electrode member and said intermediate layer; and
S: superposed area of said first electrode layer, said intermediate layer and said second electrode layer, as viewed along the direction of lamination thereof.

2. An electrochromic device according to claim 1, wherein the resistances $R_1$ and $R_2$ respectively of said first and second electrode layers and the internal resistance $R_3$ of said intermediate layer satisfy following condition:

$(R_1 + R_2) < R_3.$

3. An electrochromic device according to claim 2, wherein the resistances $R_1$ and $R_2$ respectively of said first and second electrode layers and the internal resistance $R_3$ of said intermediate layer satisfy following conditions:

$4(R_1 + R_2) < R_3.$

4. An electrochromic device according to claim 2, wherein said predetermined direction is perpendicular to said direction of lamination.

5. An electrochromic device according to claim 3, further comprising means including input and output electrical for applying a voltage between said first electrode layer and said second electrode layer.

6. An electrochromic device according to claim 3, wherein said predetermined direction is perpendicular to said direction of lamination.

7. An electrochromic device according to claim 1, wherein said predetermined direction is perpendicular to said direction of lamination.

8. An electrochromic device comprising:
    a first electrode layer;
    an intermediate layer including an electrochromic layer;
    a second electrode layer, said first electrode layer, said intermediate layer and said second electrode layer being laminated in succession; and
    an electrode member connected to one of said first and second electrode layers and extending in a predetermined direction transverse to the direction of lamination of said first electrode layer, said intermediate layer and said second electrode layer;
    wherein the resistance $R_1$ and $R_2$ respectively of said first and second electrode layers and the internal resistance $R_3$ of said intermediate layer satisfy the following conditions:

$R_1 < R_3$ and $R_2 < R_3$ said resistances $R_1$, $R_2$ and $R_3$ being defined as follows:

$$R_1 = \frac{\rho_1 \cdot S}{d_1 \cdot l^2}$$

$$R_2 = \frac{\rho_2 \cdot S}{d_2 \cdot l^2}$$

$$R_3 = \frac{\rho_3 \cdot d_3}{S}$$

wherein
$\rho_1$: resistivity of said first electrode layer;
$\rho_2$: resistivity of said second electrode layer;
$\rho_3$: ion resistivity of said intermediate layer;
$d_1$: thickness of said first electrode layer;
$d_2$: thickness of said second electrode layer;
$d_3$: thickness of said intermediate layer;

l: shortest of respective lengths, in said predetermined direction, of the electrode layer other than said one electrode layer, said electrode member and said intermediate layer; and S: superposed area of the said first electrode layer, said intermediate layer and said second electrode layer, as viewed along the direction of lamination thereof.

9. An electrochromic device according to claim 8, wherein said predetermined direction is perpendicular to said direction of lamination.

10. An electrochromic device comprising:

a first electrode layer;

an intermediate layer including an electrochromic layer;

a second electrode layer, said first electrode layer, said intermediate layer and said second electrode layer being laminated in succession; and a first electrode member and a second electrode member connected, respectively, to said first electrode layer and said second electrode layer, each electrode member extending in a predetermined direction transverse to the direction of lamination of said first electrode layer, said intermediate layer and said second electrode layer;

wherein the resistance $R_1$, $R_2$ respectively of said first and second electrode layers and the internal resistance $R_3$ of said intermediate layer satisfy the following condition:

$$\frac{R_1 + R_2}{10} < R_3$$

said resistances $R_1$, $R_2$ and $R_3$ being defined as follows:

$$R_1 = \frac{\rho_1 \cdot S}{d_1 \cdot l^2}$$

$$R_2 = \frac{\rho_2 \cdot S}{d_2 \cdot l^2}$$

$$R_3 = \frac{\rho_3 \cdot d_3}{S}$$

wherein $\rho_1$: resistivity of said first electrode layer;
$\rho_2$: resistivity of said second electrode layer;
$\rho_3$: ion resistivity of said intermediate layer;
$d_1$: thickness of said first electrode layer;
$d_2$: thickness of said second electrode layer;
$d_3$: thickness of said intermediate layer;
l: shortest of respective lengths, in said predetermined direction, of said first and second electrode layers, said first and second electrode members and said intermediate layer; and
S: superposed area of said first electrode layer, said intermediate layer and said second electrode layer, as viewed along the direction of lamination thereof.

11. An electrochromic device according to claim 10, wherein said first and second electrode layers are transparent, and said first and second electrode members are formed with low resistance materials superposed on portions of said first and second electrode layers.

12. An electrochromic device according to claim 10, wherein said predetermined direction is perpendicular to said direction of lamination.

* * * * *